2,838,413

SILICA GEL FLATTING AGENT, METHOD OF PREPARING SAME, AND COMPOSITION CONTAINING SAME

Luther O. Young, Baltimore, Md., assignor to W. R. Grace & Co., New York, N. Y., a corporation of Connecticut No Drawing. Application May 27, 1954
Serial No. 432,884

8 Claims. (Cl. 106—272)

This invention relates to a silica gel flatting agent. In one specific aspect, it relates to silica gel flatting agents suitable for use in varnishes. In another specific aspect, it relates to varnishes containing silica gel as a flatting agent.

The high gloss usually associated with clear varnish finishes is not always desirable for some applications. In the furniture industry, for example, a high gloss finish is generally characteristic of inexpensive merchandise while expensive furniture, traditionally, presents a rich appearance due to its dull, satin finish. This finish is obtained by a process consisting of hand rubbing the clear finish with some abrasive, such as pumice, mixed with oil or water. The effects of the rubbing treatment are gently abrasive, causing a slight roughness on the surface of the finish which diffuses light reflections and renders the shiny surface dull or flat. This operation is expensive and time-consuming and, although hand rubbing is still practiced to some extent, the same effect may be obtained by incorporating a proper flatting agent in the varnish.

The flatting agent, when formulated in a varnish, produces a surface phenomenon which roughens the film microscopically, thereby diffusing light reflections and reducing the luster of the film. These agents may be natural or synthetic materials. The natural materials are gums, resins and siliceous material such as diatomaceous earth. These materials have certain disadvantages either because they are expensive or fail to perform satisfactorily in the varnish.

The synthetic agents are usually metallic soaps or finely divided siliceous materials. Some metallic soaps, such as aluminum stearate, cannot be used for hot applications since high temperatures promote gelation and discoloration of the film. This prohibits their use in hot spray work. Another disadvantage is their tendency to become cloudy when stored in a warm place which results in a loss in the degree of flatness. Under certain conditions the varnishes in which flatting agents are incorporated may be thixotropic. This property is undesirable in mill bases since it makes removal of the mill base from the mill difficult. The properties of gelation and thixotropy are especially marked with the metallic soaps.

The synthetic siliceous materials have gained wide use as flatting agents. However, one of the principal objections to the agents now commercially available is the tendency of the flatting agent and the varnish base to settle from the liquid vehicle and form a hard cake when the varnish is stored for extended periods. The hard cake must then be redispersed through the varnish before the varnish is suitable for use. The redispersion ordinarily necessitates the removal of some of the liquid from above the settled varnish base and flatting agent, vigorous mixing of the cake, and gradual addition of the liquid vehicle with stirring to form a varnish of the proper consistency. In many instances, satisfactory redispersion of the varnish base and flatting agent through the liquid cannot be obtained even with this difficult and time-consuming operation.

Another objection to the synthetic silicas now available is their low bulk density. Because of the low bulk density, the amount of agent required to obtain a particular flatting effect is much greater which means a weaker film will result and generally a loss in clarity. This is particularly true of the silica aerogels.

It is therefore an object of this invention to provide an improved silica flatting agent. It is another object of this invention to provide a silica flatting agent suitable for use in varnishes which remains in suspension during long periods of storage. Still another object of this invention is to provide a method of treating silica gels to produce an improved silica flatting agent. A further object of this invention is to provide a silica flatting agent having improved flatting properties. A still further object of this invention is to provide an improvement in the manufacture of varnishes having improved gloss-reduction properties.

With these objects in view, this invention resides in impregnating a silica gel with an inert, high-melting-point wax which is insoluble in the solvent in which it is used. The wax keeps the silica gel suspended in the liquid varnish during its storage presumably by forming a boundary layer of wax around each gel particle, which renders it incompatible with the varnish system. Impregnation of the gel with the wax may be carried out by impregnating a granular silica gel and then grinding the wax-impregnated gel, by mixing a finely divided silica gel with the wax or by a concurrent operation wherein the silica gel is impregnated during the grinding operation.

The silica flatting agent of this invention is prepared from a silica hydrogel formed by conventional methods well known to those skilled in the art. The usual method of preparing the hydrogel is to mix an alkali metal silicate with an acid to form a hydrosol which, upon standing, forms the hydrogel. The hydrogel is washed substantially free of soluble salts with a suitable washing medium, following which it is dried in a conventional manner. The dried gel is then activated by heating to a temperature of about 875° F. to about 1000° F.

In order to produce the improved silica flatting agent of this invention, the activated silica gel is impregnated with a film of wax, preferably microcrystalline wax. Impregnation may be carried out in several ways. In one method the activated gel is first ground to a finely divided state and then incorporated with the wax in a ball mill, or ribbon blender, or any other suitable mixing apparatus. The wax is introduced in a molten state in amount of about 15 to 30 parts by weight of wax based on total weight of flatting agent.

In another method, the activated gel and melted wax are simultaneously fed into a micronizer, where the gel is impregnated with the wax concurrently with the grinding operation. This is a typical apparatus which grinds by attrition. The comminution of solid materials is effectuated by the use of fluid energy, such as steam heated to a relatively high temperature, or hot compressed air. The fluid is introduced under pressure in such a manner so as to create turbulence within the grinding chamber. Under these conditions the particles are thrown continuously against one another at high speeds and with great disintegrating effect. By introducing the wax with the gel, uniform impregnation of the gel takes place simultaneously with comminution. The temperature in the grinding chamber is sufficiently high to maintain the wax in a molten state which facilitates uniform impregnation. The product is discharged from the mill at a fairly high temperature and is rapidly cooled to a temperature below that at which decomposition of the wax takes place in contact with the air. Such decomposition is to be avoided since it will tend to discolor the wax and have adverse effects upon the clarity of the film.

The preferred wax for this invention is a colorless, chemically inert, microcrystalline petroleum wax which is insoluble in varnish solvents and water. Its acid number, iodine number, and saponification number are low, ranging from about 0 to 5. It is highly saturated, being a mixture of high molecular weight hydrocarbons containing many side or branch chains having between 50 and 60 carbon atoms to the molecule. It has a high melting point, above 175° F., which prevents burnishing when the varnish film is subjected to friction in polishing. A wax which I have found suitable for this purpose is Crown Wax 700.

The following example illustrates a particular method for preparing a silica flatting agent according to the present invention.

EXAMPLE I

A 17% silica hydrosol was prepared by acidifying a 32.5° Bé. sodium silicate solution with a 36.0° Bé. solution of sulphuric acid. The hydrosol set to a hydrogel in about an hour and the hydrogel was washed with a heated ammonia-water solution. After washing, the hydrogel was dried in a tunnel dryer and then activated in an indirectly-fired rotary calciner. Activation was carried out at a temperature of about 950° F. to about 1000° F. and the final total volatile matter (T. V.) of the gel was about 2.5%.

The gel was then introduced into the grinding chamber of a fluid energy mill operating under pressure and at a steam temperature of about 700° F. Melted microcrystalline wax was introduced, simultaneously with the gel, into the mill at a uniform rate by means of a non-pulsating pump and at a ratio of 15 parts (wt.) of wax to 85 parts (wt.) silica gel. Impregnation of the gel occurred during the grinding operation. The product was discharged from the mill, collected, and cooled in a water-jacketed screw conveyor and then packaged.

The product was a fine-sized, white, free-flowing, uniformly wax-coated, impalpable powder consisting essentially of silica and wax. The T. V. at 1750° F. was about 17.0% and the bulk density was about 0.40 gm./cc. The particle size averaged between 9 to 13 microns.

Impregnation may be similarly accomplished in a fluid energy mill wherein the silica gel is introduced into the mill as a hydrogel. The hydrogel may contain as much as 90% water. Under the conditions prevalent in the mill, impregnation will take place concurrently with the drying and grinding of the gel. The final product will have a moisture content of about 8%.

EXAMPLE II

A 36.0° Bé. sulphuric acid solution was reacted with a 32.5° Bé. sodium silicate solution to form a silica hydrosol. The hydrosol was allowed to set to a hydrogel and the hydrogel was broken up and washed with heated water. The washed gel was dried and then activated at a temperature of about 875° F. to about 925° F. The activated gel was then ground to a fine particle size in a fluid energy mill. The fine silica was then mixed with hot, melted microcrystalline wax in a heated ball mill in a ratio of 80 parts (wt.) of the former to 20 parts (wt.) of the latter. Mixing was continued until the wax was thoroughly incorporated with the gel. The product was a white, uniform, impalpable powder.

The silica flatting agent of this invention was found to give good flatting and settling properties when dispersed in an alkyd-urea varnish. The following example illustrates its use in this type of varnish.

EXAMPLE III

A mill base for an alkyd-urea varnish was made up of 1 part by weight of Beetle-Urea Resin No. 227-8 (urea-formaldehyde resin), 2 parts by weight of Glyptal No. 2462 (alkyd resin of the glyceryl phthalate type) and a quantity of wax-impregnated flatting agent equal to the quantity of varnish solids. These materials were charged to a ball mill to which sufficient thinner was added to produce a mixture having a viscosity of approximately 1000 centipoises. The initial charge was ground for 7 hours. Additional thinner was added and after grinding for another hour the final product was discharged from the mill. A .004" film of the varnish was applied to both clear and black panels, which were allowed to air-dry overnight and then baked at 250° F. for 50 minutes. Examination of the baked panels disclosed that the varnish film had good clarity and an excellent flatting finish.

By definition, a flatting agent is a material which, when formulated in a surface coating, reduces the luster of the film by diffusion of reflected light. It follows that the degree of diffusion is dependent upon the properties of the particular agent employed and the quantity of the agent contained in the film. The luster of a film or, conversely, the diffusion of reflected light from the surface of a film is measured by a Gardner 60° specular glossmeter. In making these determinations, a beam of light is directed at a 60° angle to the surface of a black glass plate which has been coated with the varnish. If the varnish film is a perfect gloss surface, the reflection of light will be of the same intensity and in the same angular direction as the incident ray. This reflection is termed specular. A film which completely diffuses reflected light is termed non-specular. Reflection from the surface of a flatted varnish occurs in many more directions flected light is scattered or diffused into a number of beams of lesser intensity than the incident beam. The Gardner 60° specular glossmeter measures only the intensity of the beam reflected at the same angle as that of the incident beam (60°). A comparison of the intensity of this reflected beam with the intensity of the incident beam indicates the degree of diffusion of reflected light and the flatness of the coating. For example, a clear varnish film may have a specular gloss reading of 85 which indicates that there is very little diffusion of reflected light and that the film has a high gloss. When a flatting agent, such as the flatting agent of the present invention, is added to the varnish, the diffusion of reflected light increases and the specular gloss reading decreases inversely to the quantity of flatting agent contained in the film. The same degree of flatness per unit of flatting agent is not realized by all agents due to fundamental differences in properties.

The percentage of flatting agent required to produce a certain degree of flatness is the measure of flatting efficiency. The flatting efficiency of the flatting agent of the present invention is compared with other silica flatting agents in an alkyd-urea varnish. The following table shows the measurement of specular gloss.

*Table 1*

| Flatting Agent | Percent Flatting Agent in Varnish | | | | | | | |
| --- | --- | --- | --- | --- | --- | --- | --- | --- |
| | 14 | 12 | 10 | 8 | 6 | 5 | 4 | 3 |
| | Specular Gloss Reading | | | | | | | |
| Wax Impregnated Silica Gel | 11 | 15 | 19 | 24 | 31 | 36 | 42 | 57 |
| Commercial Silica Aerogel | 17 | 22 | 30 | 42 | 54 | 60 | 67 | 73 |
| Natural Silica | 42 | 47 | 52 | 58 | 65 | 68 | 73 | 79 |

It is seen from this table that the amount of wax-impregnated silica gel needed to give a desired gloss is much less than is needed of either the aerogel or natural silica flatting agents. Consequently, the lower the amount of flatting agent required to produce the desired matte finish the greater is the mill room capacity.

The flatting agent of the present invention remains in suspension during the application period and has a uniform distribution throughout the film. Each gel particle is not merely coated with the wax, but the network of pores which make up the gel structure are filled with the wax. The settled particles in the varnish coalesce to form a soft flocculent conglomerate which is uniformly redispersible with a minimum of effort. Generally, upending the varnish container a few times is sufficient for the redispersion.

The following Table 2 shows the settling characteristics of the flatting agent of the present invention compared with other silica flatting agents when incorporated in an alkyd-urea varnish. The settling classes have been arbitrarily established as class 1, wherein the settled pigment can be redispersed by one to two hand shakes; class 2 wherein redispersion can be effected by three to six hand shakes; class 3 wherein the settled pigment can be redispersed by seven to infinity hand shakes; and class 4 wherein redispersion cannot be effected. The relative height of the floc is indicative of the ability of the flatting agent to produce matte finishes.

Table 2

| Flatting Agent | Settling Class, Percent Let-Down | | Height of Floc, Percent Let-Down | |
|---|---|---|---|---|
| | 7% | 14% | 7% | 14% |
| Wax-Impregnated Silica Gel | 1 | 1 | Medium | High. |
| Commercial Silica Aerogel | 4 | 4 | Low | Low. |
| Natural Silica | 3 | 3 | Low | Low. |

As can be seen in this table, dispersion of the flatting agent of the present invention can be easily accomplished by a few manual shakes of the container. The other flatting agents either settled to a hard cake and could not be redispersed or required prolonged periods of agitation to effect redispersion.

The concentration of wax on the silica gel which I have found to be satisfactory ranges from 15 to 30 parts by weight. The higher concentration of wax used produces better settling characteristics, i. e., the cake is softer and the floc is higher. The most serious disadvantage of adding wax in excess of 30% is that film hardness is reduced.

The wax-impregnated silica flatting agent is a product of high chemical purity. It is substantially superior to other synthetic silicas in flatting efficiency and settling characteristics. It settles to a soft cake which can be readily redispersed. As compared to commercially-available synthetic silicas, it will give greater mill room efficiency because of its higher bulk density. In addition, films containing this flatting agent have good clarity, toughness, mar resistance, and durability, and impart no color to the film.

I claim:

1. A method of manufacturing a fine-sized, free-flowing, impalpable, wax-impregnated silica gel flatting agent comprising introducing silica gel into the grinding chamber of a fluid energy mill, simultaneously introducing into said chamber a colorless, microcrystalline petroleum wax whereby the gel is simultaneously comminuted and uniformly impregnated with said wax in a ratio consisting of 85 to 70 parts by weight of gel to 15 to 30 parts by weight of wax, and rapidly cooling the resulting product to a temperature below that at which decomposition of the wax takes place in contact with the air.

2. A silica gel flatting agent adapted to be used in varnishes consisting of 85 to 70 parts by weight of finely divided silica gel impregnated with about 15 to 30 parts by weight of a colorless, microcrystalline petroleum wax which is insoluble in varnish solvents, said flatting agents having a bulk density of about 0.40 gram per cc.

3. A composition consisting of 85 to 70 parts by weight of finely divided silica gel impregnated with about 15 to 30 parts by weight of microcrystalline petroleum wax.

4. A flatting agent suitable for use in varnish compositions consisting of 85 to 70 parts by weight of finely divided silica gel impregnated with about 15 to 30 parts by weight of microcrystalline petroleum wax which is insoluble in varnish solvents.

5. A varnish flatting agent having a particle size between 9 to 13 microns consisting of 85 to 70 parts by weight of silica gel impregnated with about 15 to 30 parts by weight of a colorless, microcrystalline petroleum wax which is insoluble in varnish solvents, said wax having a melting point above 175° F.

6. A varnish composition having improved gloss-reduction properties comprising a varnish liquid and a flatting agent, said flatting agent consisting of 85 to 70 parts by weight of finely divided silica gel impregnated with about 15 to 30 parts by weight of a colorless, microcrystalline petroleum wax which is incompatible with the varnish system.

7. A method of preparing a flatting agent which comprises activating silica gel at a temperature between about 950° F. to 1000° F., grinding the activated gel, and impregnating the ground gel with a colorless, microcrystalline petroleum wax in a ratio consisting of about 85 to 70 parts by weight of gel to 15 to 30 parts by weight of wax.

8. A method of preparing a fine-sized, free-flowing, impalpable flatting agent comprising introducing silica hydrogel into the grinding chamber of a fluid energy mill, concurrently introducing into said chamber a colorless, microcrystalline petroleum wax whereby said hydrogel is simultaneously dried, ground and impregnated with said wax in a ratio consisting of about 85 to 70 parts by weight of gel to 15 to 30 parts by weight of wax, and recovering the resulting product at a temperature below that at which decomposition of the wax takes place in contact with the air.

References Cited in the file of this patent

UNITED STATES PATENTS

| | | |
|---|---|---|
| 525,292 | Slicer | Aug. 28, 1894 |
| 1,755,496 | Behrman | Apr. 22, 1930 |
| 2,141,575 | Warp | Dec. 27, 1938 |
| 2,204,981 | Clough | June 18, 1940 |
| 2,433,833 | Auer | Jan. 6, 1948 |
| 2,475,253 | Pierce | July 5, 1949 |
| 2,559,398 | Capell | July 3, 1951 |
| 2,597,871 | Iler | May 27, 1952 |
| 2,642,230 | Porges et al. | June 16, 1953 |
| 2,649,382 | Vesce | Aug. 18, 1953 |
| 2,666,803 | Kurlausky | Jan. 19, 1954 |

FOREIGN PATENTS

| | | |
|---|---|---|
| 134,391 | Australia | Sept. 23, 1949 |

U. S. DEPARTMENT OF COMMERCE
PATENT OFFICE

CERTIFICATE OF CORRECTION

Patent No. 2,838,413     Luther O. Young     June 10, 1958

It is hereby certified that error appears in the printed specification of the above numbered patent requiring correction and that the said Letters Patent should read as corrected below.

Column 4, line 29, after "directions" insert -- than that of the incident beam and, as a result, the re- --.

Signed and sealed this 5th day of August 1958.

(SEAL)
Attest:
KARL H. AXLINE
Attesting Officer

ROBERT C. WATSON
Commissioner of Patents